UNITED STATES PATENT OFFICE.

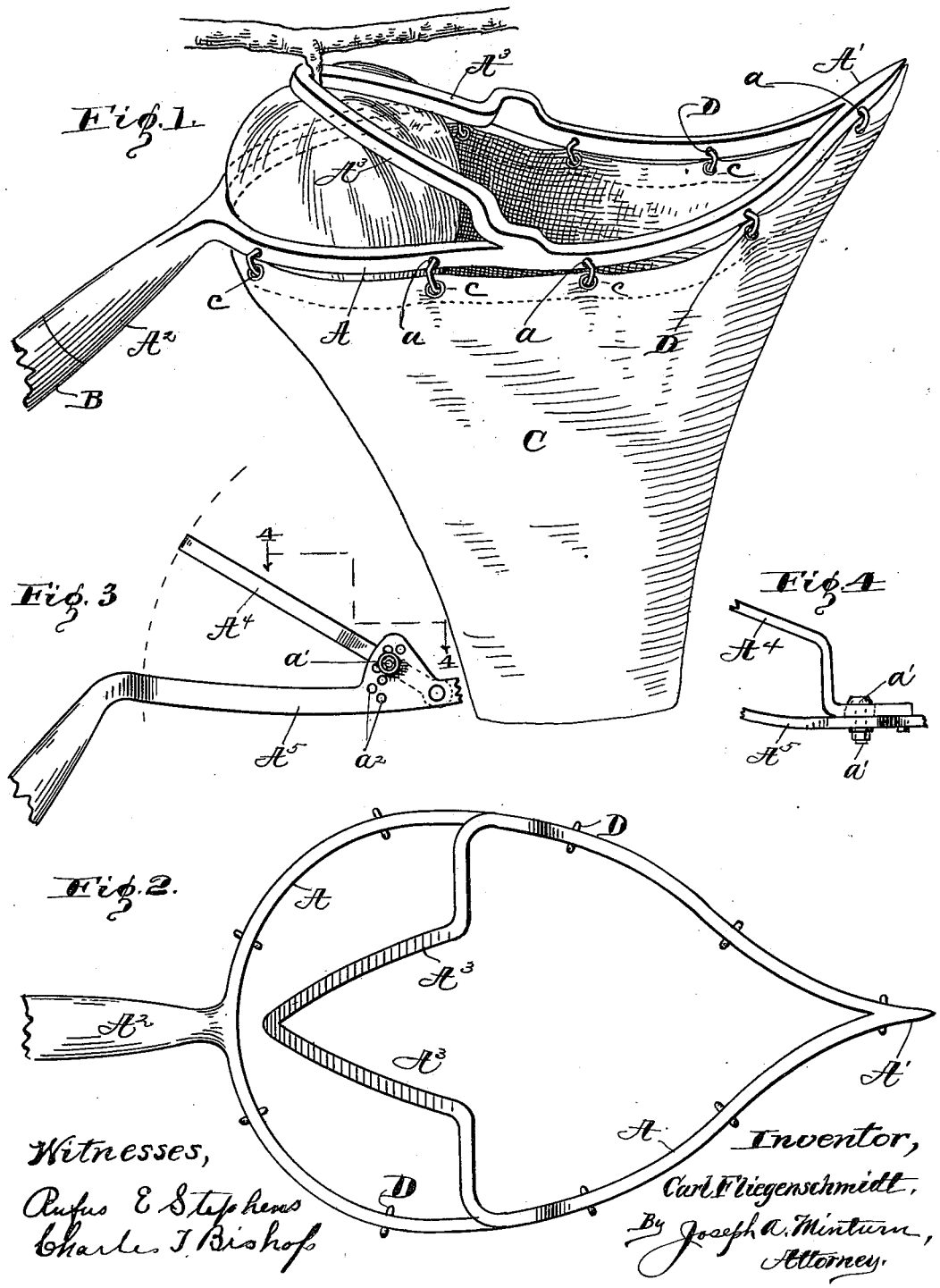

CARL FLIEGENSCHMIDT, OF INDIANAPOLIS, INDIANA.

FRUIT-PICKER.

SPECIFICATION forming part of Letters Patent No. 626,058, dated May 30, 1899.

Application filed March 25, 1899. Serial No. 710,463. (No model.)

*To all whom it may concern:*

Be it known that I, CARL FLIEGENSCHMIDT, a citizen of the United States, residing at Indianapolis, in the county of Marion and State of Indiana, have invented certain new and useful Improvements in Fruit-Pickers, of which the following is a specification.

The object of this invention is to provide an instrument adapted in shape to be readily thrust between the branches of the fruit-trees and which will have a principal picking-arm extending above the mouth or main frame of the picker and having the working end of the picking-arm in substantial longitudinal alinement with the handle of the instrument in order to economize to the greatest degree the power required to detach the fruit.

The object also is to provide a main picking-arm in such relation to a receptacle that the fruit will be securely retained after it is picked and will be handled from beginning to end with minimum exposure to bruising.

I accomplish the objects of the invention by the mechanism illustrated in the accompanying drawings, in which—

Figure 1 is a perspective view of my invention in operative position; Fig. 2, a top or plan view of same; Fig. 3, a detail of the frame and picker-arm, showing a modified construction; and Fig. 4, a detail in plan view of the part 4 4 of Fig. 3.

Similar letters of reference indicate like parts throughout the several views of the drawings.

A represents the main frame of the picker, the general contour of which in plan view is oval, except that the smaller front end is drawn out into a point A' for two purposes—first, to enable the picker to be pushed and guided between the branches, and, second, in the fork formed on the inside to provide a means for engaging and plucking fruit which occasionally cannot be reached and removed by the main picking-arm behind.

$A^2$ is the hollow shank or socket, into which the end of the handle B is fastened in the usual manner. The handle is preferably round and of any desired length.

$A^3$ is the main picker-arm, the ends of which are preferably integral with the opposite sides of the frame A. The arm is bent to the rear midway of its length to form an angular opening, into which the stem of the fruit to be picked is brought, and to facilitate the slipping of the arm over the fruit the rearwardly-bent middle of the arm will be elevated above the frame A, as shown.

C is a canvas bag, or, if preferred, it may be a tube, extending down within reach of the operator in the well-known way, and into this bag or tube the fruit is caught as it drops after being pulled from the tree by the picker. This canvas has eyelets $c$, and the frame A has correspondingly-placed openings $a$, through which holes and eyelets the rings D are passed to fasten the canvas to the frame.

In practice the frame A is introduced into position under the fruit, the latter being over the large space in front of the arm $A^3$. The frame is raised and pushed forward to bring the arm $A^3$ over the fruit, with the stem of the latter passing up through the angular opening in the arm. A forward movement of the arm after the stem has reached the angle of the bend would detach the fruit, but the leverage of the sides of the arm $A^3$ against the fruit would bruise it, and to avoid this I place the bent arm in proximity to the adjacent end of the frame A to cause the frame A to bear against the fruit, thereby moving the latter bodily forward under pressure delivered through the handle B and preventing the bruising of the fruit. The sides of the bag C underneath the picking-arms are made sloping to cause the fruit to slide instead of dropping down when loosened from the tree.

The pickers will be made an average size for apples, peaches, and the like, so as to be of suitable dimensions for the bulk of the fruit and practically all right for the exceptionally large and small sizes.

Figs. 3 and 4 show a modified construction, in which the arm $A^4$ is hinged to the main frame $A^5$ to permit of its adjustment in height above the main frame. The adjustment is held by a bolt $a'$, which passes through a slot in the arm and thence through an opening $a^2$ in the frame. A series of openings $a^2$ at varying heights will be made in the frame $A^5$. This enables the arm to be adjusted to suit the size of the fruit to be picked.

Having thus fully described my invention, what I claim as new, and wish to secure by Letters Patent of the United States, is—

1. In a fruit-picker, an oblong frame passing into a point at one end and having a handle attached obliquely to the end opposite the point, a picker-arm consisting of a bar having its ends secured to diametrically opposite sides of the frame, said arm having its middle portion bent in a direction away from the point of the frame and in an upward oblique direction to the frame to form an acute angle above the frame approximately in longitudinal alinement with the handle of the picker, and a receiver secured underneath the frame, substantially as described.

2. In a fruit-picker, an oblong frame having one end passing into a point which is turned up, and having a handle secured to the other end in an oblique downward direction, an arm secured at its ends to opposite sides of the oblong frame, between its handle and point, said arms being bent up and back to form an acute-angled portion approximately in longitudinal alinement with the handle and above the frame, and a receptacle secured to the frame and depending therefrom, substantially as described.

In witness whereof I have hereunto set my hand and seal, at Indianapolis, Indiana, this 14th day of March, A. D. 1899.

CARL FLIEGENSCHMIDT. [L. S.]

Witnesses:
CARL MUELLER,
JOSEPH A. MINTURN.